UNITED STATES PATENT OFFICE.

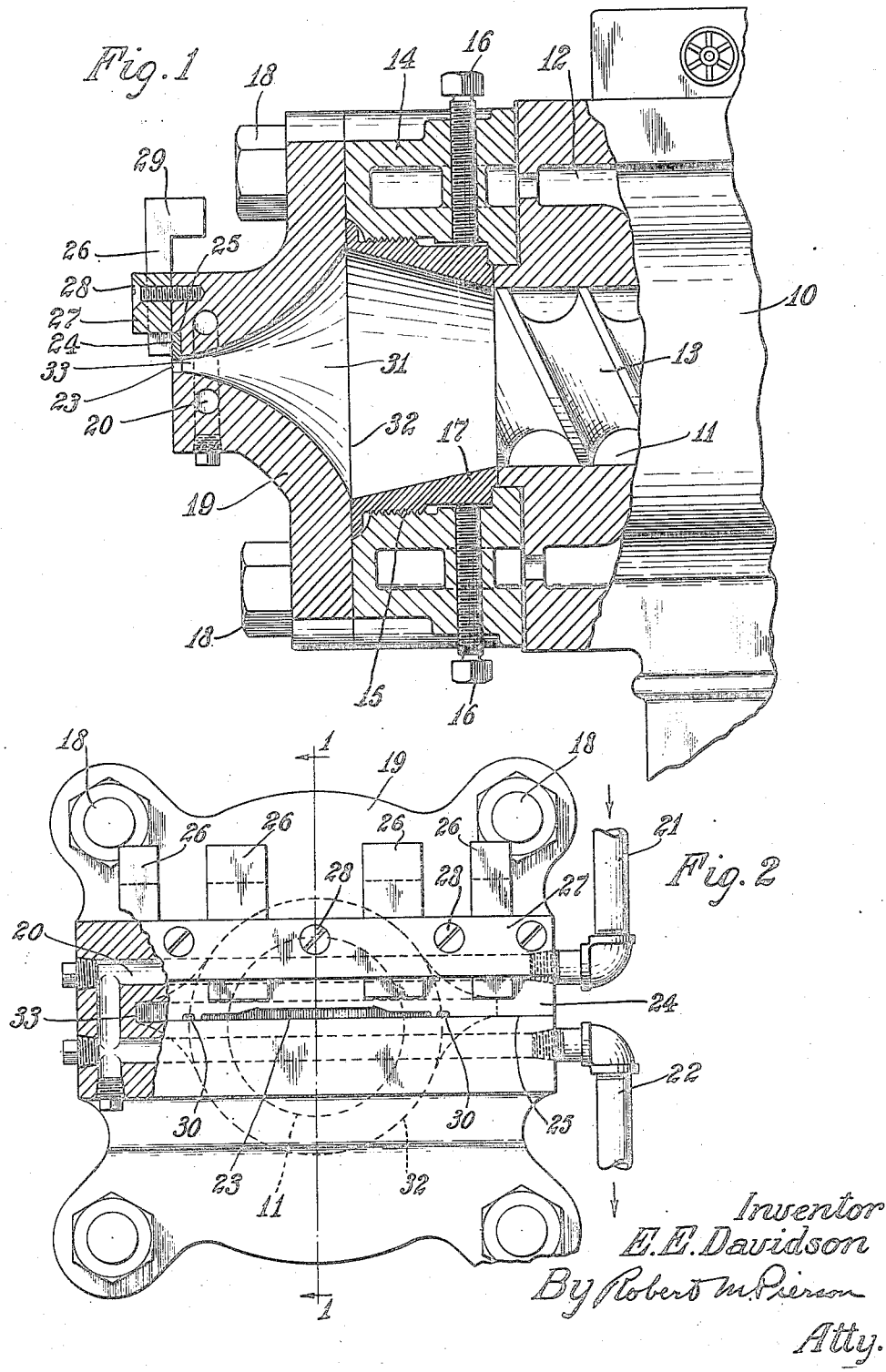

ELIAS E. DAVIDSON, OF AKRON, OHIO, ASSIGNOR TO THE B. F. GOODRICH COMPANY, OF NEW YORK, N. Y., A CORPORATION OF NEW YORK.

APPARATUS FOR MAKING SHEETS OF PLASTIC COMPOSITION.

1,397,087.   Specification of Letters Patent.   Patented Nov. 15, 1921.

Application filed December 11, 1920. Serial No. 429,927.

*To all whom it may concern:*

Be it known that I, ELIAS E. DAVIDSON, a citizen of the United States, residing at Akron, in the county of Summit and State of Ohio, have invented a certain new and useful Apparatus for Making Sheets of Plastic Composition, of which the following is a specification.

This invention relates to machines for extruding plastic material, and especially vulcanizable rubber composition, in the form of a strip, through a die of suitable shape. Such devices in the rubber manufacturing art are commonly known as tube machines or forcing machines.

My principal object is to provide a construction at the delivery end which will enable a strip wider than the diameter of the screw barrel or forcing chamber to be produced, and, a further object is to provide an improved form of interchangeable die member and a mounting therefor which will permit the form or size of the die opening to be varied quickly, without a prolonged shutdown of the machine, thus avoiding the accumulation of a large amount of cured stock and the consequent trouble, waste of material and loss of time in cleaning out this accumulation when the machine is again started.

Of the accompanying drawings:

Figure 1 is a longitudinal section, partly in elevation, showing a rubber forcing machine provided with my improvements.

Fig. 2 is a front elevation thereof, partly in section.

In the drawings, 10 is the body of the machine, formed with the usual cylinder or forcing chamber 11 having a steam jacket 12 and containing the feed screw 13. At the front end of this body is a detachable steam-jacketed head 14 having a central aperture formed with a screw-thread 15 and radial set-screws 16 for securing the spider which holds the mandrel when a mandrel is used for making tubes. In adapting this structure to my present purposes, I make use of the said thread and set-screws for securing in place an annular transmitting nozzle 17 having a forwardly-flared conical aperture whose inner end is of the same diameter as the cylinder 11, while its outer end is of a larger diameter in order to expand equally in all directions the stream of rubber issuing from the screw cylinder, in natural or smooth stream lines.

On the front of the head 14, and attached to the body 10 by means of through bolts 18 which also secure said head in place, is an outer nozzle plate 19 in the form of a casting which is adapted to be kept hot by means of a steam jacket 20, constituted by drilled pasages in the casting, to whose ends are connected steam supply and discharge pipes 21, 22. The die aperture 23 at the delivery end of this nozzle plate is in the form of an opening of relatively great width in a horizontal direction transverse to the axis of flow, and of relatively narrow width vertically, so as to form a relatively wide and thin strip of rubber which in this case has a cross-sectional shape adapted for a pneumatic tire tread. The lower edge of this die opening is constituted by a fixed surface on the nozzle plate, while its upper and two end edges are formed on a die plate or member 24 seated in a groove 25 of rectangular section, and held to its seat therein by the lower ends of a series of individually-acting, vertical L-shaped wedges 26. These wedges are mounted in a horizontal row in suitable ways or guides formed between the front face of the nozzle plate 19 and a retaining plate 27 secured thereto by means of screws 28, and their lower ends overlap and confine the upper marginal portion of the die-plate. The horizontal tangs or hook members 29 at the uper ends of the wedges 26 form projections under which a pry-bar may be inserted when it is desired to lift the wedges and release the die plate 24.

Adjacent to the extremities of the main die opening 23, are two small auxiliary openings 30, 30 formed mainly in the die plate 24, whose purpose is to transfer the formation of eddies in the flowing stream of material, due to friction against the sides of the discharge nozzle or against the rubber in any dead spaces which may exist, from the immediate edges of the main strip to points remote from said strip, thus giving smooth edges to the main strip by the production of narrow waste strips or ribbons. This waste may be used over again.

The nozzle passage 31 in the plate 19 is of such length as to transfer the die opening 23 to a point considerably in front of the mouth of nozzle 17, so that the material has a chance to distribute itself with approximate uniformity to all parts of said die opening. The passage 31 contracts smoothly or uniformly in natural stream lines in a vertical direction from a circle 32 of the same diameter as the mouth of nozzle 17 to a narrow rectangular opening 33 whose height is only sufficient to provide the maximum thickness of tread or other strip which it is desired to form. In a lateral horizontal direction it expands in stream lines to take in the maximum desired width of strip which is considerably wider than the particular die-opening 23 here shown. It will be noted that this particular opening however is considerably wider in a horizontal direction than the diameter of the screw cylinder 11. It has heretofore been found difficult or impossible to "tube" a strip of plastic rubber wider than the diameter of the forcing chamber, but by the herein-described combination of parts I have successfully solved this problem. Furthermore, the provision of an interchangeable die member such as 24, secured by quick-acting wedges, enables me to substitute a die member giving a different form or size of opening with only a brief stoppage of the machine, which avoids any considerable setting of the vulcanizable stock with the consequent loss of time and material in cleaning out this accumulation in order to get started again.

My improvements may be used to produce relatively wide slabs of sponge rubber or other stock as well as tread strips, and the described features of construction may be considerably varied without departing from the invention.

I claim:

1. In a rubber forcing machine, the combination of a forcing chamber, an expanding nozzle at the outlet thereof, and a delivery nozzle at the outlet of said expanding nozzle terminating in a relatively wide and thin die opening.

2. In a rubber forcing machine, the combination of a hot-jacketed screw cylinder containing a forcing screw, a transmitting nozzle at the outlet of said cylinder having a forwardly-flared conical aperture, and a delivery nozzle at the outlet of said transmitting nozzle which contracts transversely in one direction and expands in a direction at right-angles thereto to an outlet having a width greater than the diameter of said cylinder.

3. In a rubber forcing machine, the combination of a circular forcing chamber, means for expanding in all lateral directions the stream of material issuing therefrom, a delivery nozzle for thereafter contracting said stream vertically and leaving it relatively wide horizontally, and an exchangeable die plate forming an outlet for said nozzle and detachably secured thereto.

4. In a rubber forcing machine, the combination of a circular forcing chamber, a delivery nozzle having an outlet relatively far in advance of the discharge end of said chamber and of a form relatively narrow vertically and wider horizontally than the diameter of said forcing chamber, means for leading the material in smooth stream lines from said chamber to said outlet, and a plate detachably secured at said outlet and formed with a die opening.

5. In a rubber forcing machine, the combination of a forcing chamber, a delivery nozzle leading therefrom and having a die-plate seat, a die-plate detachably mounted on said seat, and a quick-acting wedge for holding said die-plate in place.

6. In a rubber forcing machine, the combination of a forcing chamber, a delivery nozzle leading therefrom and terminating in an opening which is relatively wide in one transverse direction and relatively narrow in a direction at right-angles thereto, said nozzle having a die-plate seat adjacent to said opening, an elongated die-plate detachably mounted on said seat, and a row of individually-acting wedges holding said die-plate to its seat.

7. In a rubber forcing machine, the combination of a forcing cylinder, a delivery nozzle leading therefrom and terminating in an opening which is relatively narrow vertically and wider horizontally than the diameter of said cylinder, a die-plate seat at said opening, a horizontally-elongated die-plate detachably mounted on said seat, and a horizontal row of vertical, individually-acting wedges mounted in guide-ways on the front of the nozzle and normally overlapping and confining the upper margin of said die-plate at their lower ends, said wedges at their upper ends being formed for engagement by a lifting pry-bar.

In witness whereof I have hereunto set my hand this 6th day of December, 1920.

ELIAS E. DAVIDSON.